(12) United States Patent
Gong et al.

(10) Patent No.: US 11,505,631 B2
(45) Date of Patent: *Nov. 22, 2022

(54) ETHYLENE/ALPHA-OLEFIN COPOLYMER AND METHOD FOR PREPARING THE SAME

(71) Applicant: LG Chem, Ltd., Seoul (KR)

(72) Inventors: Jin Sam Gong, Daejeon (KR); Seung Hwan Jung, Daejeon (KR); Jung Ho Jun, Daejeon (KR); Rae Keun Gwak, Daejeon (KR); Choong Hoon Lee, Daejeon (KR); Eun Jung Lee, Daejeon (KR); Hyun Jin Ju, Daejeon (KR); In Sung Park, Daejeon (KR); Sang Eun Park, Daejeon (KR)

(73) Assignee: LG Chem, Ltd.

( * ) Notice: Subject to any disclaimer, the term of this patent is extended or adjusted under 35 U.S.C. 154(b) by 60 days.

This patent is subject to a terminal disclaimer.

(21) Appl. No.: 17/045,694

(22) PCT Filed: May 3, 2019

(86) PCT No.: PCT/KR2019/005363
§ 371 (c)(1),
(2) Date: Oct. 6, 2020

(87) PCT Pub. No.: WO2019/212304
PCT Pub. Date: Nov. 7, 2019

(65) Prior Publication Data
US 2021/0163643 A1 Jun. 3, 2021

(30) Foreign Application Priority Data
May 4, 2018 (KR) .................. 10-2018-0052043

(51) Int. Cl.
| C08F 210/16 | (2006.01) |
| C09J 123/16 | (2006.01) |
| C09J 123/08 | (2006.01) |

(52) U.S. Cl.
CPC ....... C08F 210/16 (2013.01); *C09J 123/0815* (2013.01); *C09J 123/16* (2013.01)

(58) Field of Classification Search
CPC .. C08F 210/16; C08F 4/6592; C08F 2420/02; C09J 123/0815; C09J 123/16
See application file for complete search history.

(56) References Cited

U.S. PATENT DOCUMENTS

| 4,935,474 | A | 6/1990 | Ewen et al. |
| 5,739,225 | A | 4/1998 | Tazaki et al. |
| 5,914,289 | A | 6/1999 | Razavi |
| 6,107,430 | A | 8/2000 | Dubois et al. |
| 6,121,402 | A | 9/2000 | Machida et al. |
| 6,183,863 | B1 | 2/2001 | Kawachi et al. |
| 6,828,394 | B2 | 12/2004 | Vaughan et al. |
| 6,841,631 | B2 | 1/2005 | Loveday et al. |
| 6,894,128 | B2 | 5/2005 | Loveday et al. |
| 7,531,601 | B2 | 5/2009 | Karjala et al. |
| 7,795,365 | B2 | 9/2010 | Karjala et al. |
| 7,989,543 | B2 | 8/2011 | Karjala et al. |
| 8,222,339 | B2 | 7/2012 | Yalvac et al. |
| 8,329,848 | B2 | 12/2012 | Kajihara et al. |
| 8,901,267 | B2 | 12/2014 | Kum et al. |
| 9,023,945 | B2 | 5/2015 | Mavridis et al. |
| 9,353,295 | B2 | 5/2016 | Kum et al. |
| 9,822,200 | B2 | 11/2017 | Kim et al. |
| 2002/0147286 | A1 | 10/2002 | Resconi et al. |
| 2006/0198983 | A1 | 9/2006 | Patel |
| 2008/0281037 | A1 | 11/2008 | Karjala et al. |
| 2010/0087609 | A1 | 4/2010 | Park et al. |
| 2010/0160497 | A1 | 6/2010 | Karjala et al. |
| 2011/0003524 | A1 | 1/2011 | Claasen et al. |
| 2012/0196985 | A1 | 8/2012 | Lee et al. |
| 2013/0085246 | A1 | 4/2013 | Kum et al. |
| 2013/0202902 | A1 | 8/2013 | DeJesus et al. |
| 2013/0255756 | A1* | 10/2013 | Seo ................. H01L 31/0481 136/251 |
| 2015/0045526 | A1 | 2/2015 | Kum et al. |
| 2016/0257862 | A1 | 9/2016 | Yoshimoto et al. |
| 2016/0326281 | A1 | 11/2016 | Kim et al. |
| 2021/0024729 | A1* | 1/2021 | Jun ..................... C08F 210/08 |
| 2021/0062050 | A1* | 3/2021 | Gwak .................. C08F 4/6592 |
| 2021/0155727 | A1* | 5/2021 | Gwak ................ C09J 123/0815 |

(Continued)

FOREIGN PATENT DOCUMENTS

| CN | 101291964 A | 10/2008 |
| CN | 101679561 A | 3/2010 |

(Continued)

OTHER PUBLICATIONS

KR 20190025438 A (Mar. 11, 2019); machine translation. (Year: 2019).*
International Search Report from Application No. PCT/KR2019/005371 dated Aug. 9, 2019, 3 pages.
Kim et al., "Production of Polyethylene Wax via Metallocene Catalysts [(TMDS)Cp2]ZrCl2 and [(n-Bu)2Cp2]ZrCl2 in the Presence of Hydrogen Gas as a Chain Transfer Reagent", School of Dispaly and Chemical Engineering, Yeungnam University, Polymer (Korea), vol. 32, No. 6, Aug. 2008, pp. 566-572, English Translation of Abstract Included Only.

(Continued)

*Primary Examiner* — Rip A Lee

(74) *Attorney, Agent, or Firm* — Lerner, David, Littenberg, Krumholz & Mentlik, LLP

(57) ABSTRACT

The present invention provides an ethylene/alpha-olefin copolymer having narrow molecular weight distribution together with a low density and an ultra low molecular weight, and minimized number of unsaturated functional groups, and in which a comonomer is uniformly present to show excellent physical properties, and a method for preparing the same.

19 Claims, 4 Drawing Sheets

(56) References Cited

U.S. PATENT DOCUMENTS

2021/0163643 A1   6/2021  Gong et al.
2021/0230460 A1*  7/2021  Jun ..................... C08F 4/6493

FOREIGN PATENT DOCUMENTS

| | | |
|---|---|---|
| CN | 102971346 A | 3/2013 |
| CN | 103122042 A | 5/2013 |
| CN | 103228721 A | 7/2013 |
| CN | 103476888 A | 12/2013 |
| CN | 106661142 A | 5/2017 |
| EP | 3216795 A1 | 9/2017 |
| JP | S61162539 A | 7/1986 |
| JP | 2000226561 A | 8/2000 |
| JP | 2005120308 A | 5/2005 |
| JP | 2013533351 A | 8/2013 |
| JP | 2015120825 A | 7/2015 |
| JP | 2018502819 A | 2/2018 |
| KR | 20010112350 A | 12/2001 |
| KR | 20030012308 A | 2/2003 |
| KR | 20040076965 A | 9/2004 |
| KR | 20070112794 A | 11/2007 |
| KR | 20070118087 A | 12/2007 |
| KR | 20080099529 A | 11/2008 |
| KR | 20100025072 A | 3/2010 |
| KR | 20100126712 A | 12/2010 |
| KR | 20110024036 A | 3/2011 |
| KR | 20110116417 A | 10/2011 |
| KR | 101097378 B1 | 12/2011 |
| KR | 101289332 B1 | 7/2013 |
| KR | 20140019351 A | 2/2014 |
| KR | 20160054849 A | 5/2016 |
| KR | 20190025438 A * | 3/2019 ............ C08F 210/16 |
| WO | 9518158 A1 | 7/1995 |
| WO | 2004076502 A1 | 9/2004 |

OTHER PUBLICATIONS

International Search Report for Application No. PCT/KR2019/005362 dated Aug. 14, 2019, 3 pages.
Search report from International Application No. PCT/KR2019/005363, dated Aug. 14, 2019.
Ryabov, Alexey N., "Constrained geometry complexes of titanium (IV) and zirconium (IV) involving cyclopentadienyl fused to thiophene ring." Journal of Organometallic Chemistry, vol. 690, No. 19, Aug. 5, 2005, pp. 4213-4221.
Examination Report for Indian Application No. 202017013608 dated Dec. 20, 2021, 2 pgs.
Examination Report for Indian Application No. 202017039423 dated Dec. 13, 2021, 2 pgs.
European Search Report for Application No. EP19796263, dated Nov. 20, 2020, 8 pages.
Search Report dated Jun. 22, 2022 from Office Action for Chinese Application No. 201980006767.6 dated Jun. 30, 2022. 3 pgs.
Search Report dated Jul. 14, 2022 from Office Action for Chinese Application No. 201980021950.3 dated Jul. 22, 2022. 2 pgs.

* cited by examiner

ETHYLENE/ALPHA-OLEFIN COPOLYMER AND METHOD FOR PREPARING THE SAME

CROSS-REFERENCE TO RELATED APPLICATIONS

The present application is a national phase entry under 35 U.S.C. § 371 of International Application No. PCT/KR2019/005363 filed May 3, 2019, which claims priority from Korean Patent Application No. 10-2018-0052043 filed May 4, 2018, all of which are incorporated herein by reference.

TECHNICAL FIELD

The present invention relates to an ethylene/alpha-olefin copolymer in which a comonomer is present uniformly in a copolymer to show excellent physical properties, and a method for preparing the same.

BACKGROUND ART

Olefin polymerization catalyst systems may be classified into a Ziegler-Natta and metallocene catalyst systems, and these two highly active catalyst systems have been developed in accordance with the characteristics of each. The Ziegler-Natta catalyst has been widely applied in a commercial process since its invention in the 1950s, but is a multi-site catalyst in which many active sites are coexist and has the characteristics of broad molecular weight distribution of a polymer, in addition, since the composition distribution of a comonomer is nonuniform, there are limitations in securing desired physical properties.

Meanwhile, the metallocene catalyst is composed of the combination of a main catalyst having a transition metal compound as a main component and a promoter which is an organometal compound having aluminum as a main component, and such catalyst is a homogeneous complex catalyst and is a single site catalyst. According to the single site properties, a polymer having narrow molecular weight distribution and uniform composition distribution of a comonomer is obtained, and according to the structural deformation of the ligand of a catalyst and polymerization conditions, the steric regularity, copolymerization properties, molecular weight, crystallinity, etc. of a polymer may be changed.

U.S. Pat. No. 5,914,289 discloses a method of controlling the molecular weight and molecular weight distribution of a polymer using metallocene catalysts supported by individual supports, but the amount of a solvent used for preparing a supported catalyst and preparation time are consumed a lot, and there is inconvenience to support the metallocene catalysts used on individual supports.

Korean Patent Application No. 10-2003-0012308 discloses a method of controlling molecular weight distribution by supporting a dinuclear metallocene catalyst and a mononuclear metallocene catalyst together with an activator on a support and polymerizing while changing the combination of the catalysts in a reactor. However, such method has limitations in accomplishing the properties of individual catalysts at the same time, and a metallocene catalyst part is separated from a support component of a completed catalyst, thereby inducing fouling in a reactor.

Meanwhile, a linear low-density polyethylene is prepared by copolymerizing ethylene and alpha olefin using a polymerization catalyst at a low pressure, and is a resin having narrow molecular weight distribution and a short chain branch with a certain length without a long chain branch. A linear low-density polyethylene film has the properties of a common polyethylene, high breaking strength and elongation, and excellent tearing strength and falling weight impact strength, and thus, is increasingly used in a stretch film, an overlap film, etc., to which the conventional low-density polyethylene or high-density polyethylene is difficult to apply.

However, most linear low-density polyethylene using 1-butene or 1-hexene as a comonomer is prepared in a single gas phase reactor or a single loop slurry reactor, and has higher productivity when compared with a process using a 1-octene comonomer. However, the properties of such a product also are greatly inferior to a case using a 1-octene comonomer due to the limitations of catalyst technology used and process technology used, and the molecular weight distribution thereof is narrow, and thus, processability is poor.

U.S. Pat. No. 4,935,474 reports a method of preparing polyethylene having broad molecular weight distribution by using two or more metallocene compounds. U.S. Pat. No. 6,828,394 reports a method of preparing polyethylene having excellent processability and which is particularly suitable as a film, by mixing a comonomer having good bonding properties and a comonomer without them. In addition, U.S. Pat. Nos. 6,841,631 and 6,894,128 indicate that polyethylene having bimodal or multimodal molecular weight distribution is prepared by using a metallocene catalyst in which at least two kinds of metal compounds are used, and is applicable to the use of a film, a blow molding, a pipe, etc. However, although such products have improved processability, but there is a problem that the extrusion appearance is rough and physical properties are unstable even under relatively good extrusion conditions, because of the nonuniform dispersion state by the molecular weight in a unit particle.

In such a background, the preparation of an excellent product making balance between physical properties and processability is continuously required, and particularly, a polyethylene copolymer having excellent processability is increasingly required.

DISCLOSURE OF THE INVENTION

Technical Problem

Accordingly, the present invention is for solving the above-described limitations of the conventional art, and providing an ethylene/alpha-olefin copolymer having narrow molecular weight distribution, wherein a comonomer is uniformly present to show excellent physical properties, particularly, excellent processability, and a method for preparing the same.

In addition, the present invention provides a hot melt adhesive composition showing excellent processability and adhesion properties by including the ethylene/alpha-olefin copolymer.

Technical Solution

In order to solve the above tasks, according to an embodiment of the present invention, there is provided an ethylene/alpha-olefin copolymer satisfying the following conditions i) to iv):

i) a density of 0.85 to 0.89 g/cc,
ii) molecular weight distribution (MWD): 1.5 to 3.0, iii) viscosity: 6,000 cP to 40,000 cP, as measured at a temperature of 180° C., and iv) ReXRc≤1.0 where Re=kee/kec, Rc=kcc/kce, kee represents a propagation reaction rate constant when ethylene is added to a propagation chain of which terminal active site is an ethylene monomer, kec represents a propagation reaction rate constant when an alpha olefin comonomer is added to a propagation chain of which terminal active site is an ethylene monomer, kcc represents a propagation reaction rate constant when an alpha olefin comonomer is added to a propagation chain of which terminal active site is an alpha olefin comonomer, and kce represents a propagation reaction rate constant when an ethylene monomer is added to a propagation chain of which terminal active site is an alpha olefin comonomer.

Advantageous Effects

The ethylene/alpha-olefin copolymer according to the present invention has a low density, an ultra low molecular weight, and narrow molecular weight distribution, thereby showing excellent impact strength and mechanical properties. In addition, the ethylene/alpha-olefin copolymer according to the present invention has excellent structural stability, because a comonomer is uniformly distributed, and thus, a low complex viscosity may be shown in various temperature regions and shear rates, and excellent processability may be shown.

Accordingly, if the ethylene/alpha-olefin copolymer according to the present invention is applied to a hot melt adhesive composition, the flowability or reactivity of a copolymer is relatively constant in various process conditions, and reaction efficiency may be improved, and a hot melt adhesive composition having excellent processability and adhesion properties may be prepared.

BEST MODE FOR CARRYING OUT THE INVENTION

Figure 1:
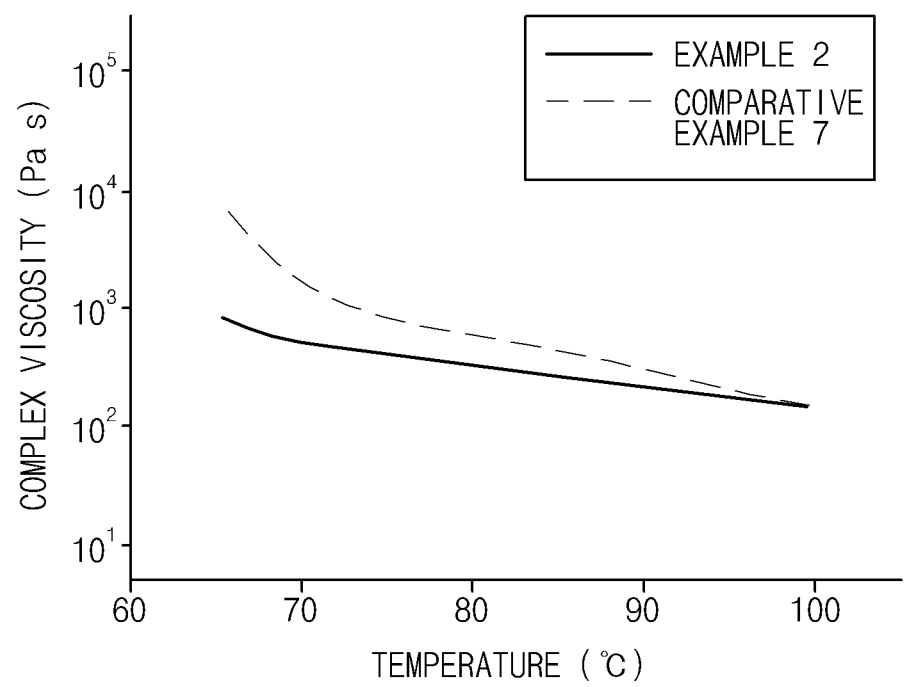
FIG. 1 shows measured results of viscosity change according to temperature change with respect to Example 2 as an embodiment of the present invention and Comparative Example 7.

The terminology used herein is for the purpose of describing particular example embodiments only and is not intended to limit the present invention. The singular forms are intended to include the plural forms as well, unless the context clearly indicates otherwise. It will be understood that the terms "comprise" and/or "comprising," when used in this specification, specify the presence of stated features, steps, elements or the combination thereof, but do not preclude the presence or addition of one or more other features, steps, elements or the combination thereof.

The present invention may have various changes and be embodied in various forms, and specific embodiments are illustrated and will be explained in detail below. However, it should be understood that the present invention is not limited to a specific disclosure type, but includes all changes, equivalents and substituents included in the spirit and technical range of the present invention.

1. Ethylene/Alpha-Olefin Copolymer

Hereinafter, the ethylene/alpha-olefin copolymer of the present invention will be explained in detail.

An ethylene/alpha-olefin copolymer according to an embodiment of the present invention satisfies the following conditions i) to iv):

i) density: 0.85 to 0.89 g/cc, ii) molecular weight distribution (MWD): 1.5 to 3.0, iii) viscosity: 4,000 cP to 50,000 cP, as measured at a temperature of 180° C., and iv) ReXRc≤1.0 where Re=kee/kec, Rc=kcc/kce, kee represents a propagation reaction rate constant when ethylene is added to a propagation chain of which terminal active site is an ethylene monomer, kec represents a propagation reaction rate constant when an alpha olefin comonomer is added to a propagation chain of which terminal active site is an ethylene monomer, kcc represents a propagation reaction rate constant when an alpha olefin comonomer is added to a propagation chain of which terminal active site is an alpha olefin comonomer, and kce represents a propagation reaction rate constant when an ethylene monomer is added to a propagation chain of which terminal active site is an alpha olefin comonomer.

The crosslinking between copolymers is carried out by vinyl and vinylidene, including double bonds, and the ethylene/alpha-olefin copolymer according to an embodiment satisfies the ReXRc value in the above-described range through the injection of an optimized amount of hydrogen together with a catalyst which will be explained later during polymerization and uniform mixing of an alpha-olefin comonomer, which means that a comonomer is uniformly distributed in a polymer. Generally, shear fluidization characteristics may be measured through measuring complex viscosity according to frequency, and in such a copolymer, the complex viscosity is kept low in a specific temperature and angular frequency ranges and thus processability may be significantly excellent.

Accordingly, the present invention may largely improve the physical properties, particularly, long-period properties of ethylene/alpha olefin copolymer by using a catalyst which will be explained later and injecting an optimized amount of hydrogen during polymerization so that the conditions i) to iv) may be satisfied at the same time.

Particularly, the ethylene/alpha-olefin copolymer according to an embodiment of the present invention additionally has a density measured according to ASTM D-792 of 0.85 g/cc to 0.89 g/cc in conditions satisfying the above-described physical properties. Particularly, the density may be 0.855 g/cc or more, or 0.86 g/cc or more, or 0.865 g/cc or more, and 0.89 g/cc or less, or 0.885 g/cc or less, or 0.880 g/cc or less.

Generally, the density of an olefin-based polymer is influenced by the kind and amount of a monomer used during polymerization, a polymerization degree, etc., and a copolymer may be largely influenced by the amount of a comonomer. With the increase of the comonomer, an ethylene/alpha-olefin copolymer having a low density may be prepared, and the amount of the comonomer which is possibly introduced into a copolymer may be dependent on the copolymerization properties of a catalyst, that is, the properties of the catalyst.

In the present invention, a large amount of a comonomer may be introduced due to the use of a catalyst composition including a transition metal compound having a specific structure. As a result, the ethylene/alpha-olefin copolymer according to an embodiment of the present invention may have a low density as described above, and as a result, excellent processability may be shown. More particularly, the ethylene/alpha-olefin copolymer may preferably have a density of 0.860 g/cc to 0.885 g/cc, more preferably, a density of 0.865 g/cc to 0.880 g/cc, and in this case, the maintenance of mechanical properties and improving effect of impact strength according to the control of the density are even more remarkable.

In addition, the ethylene/alpha-olefin copolymer according to an embodiment of the present invention has a viscosity of 50,000 cP or less as measured at 180° C. in conditions satisfying a low density properties as described above. More particularly, the viscosity of the ethylene/alpha-olefin copolymer may be 40,000 cP or less, 37,000 cP or less, or 35,000 cP or less, and 4,000 cP or more, or 6,000 cP or more, or 7,000 cP or more, or 8,500 cP or more.

In addition, the ethylene/alpha-olefin copolymer according to an embodiment of the present invention has molecular weight distribution (MWD) of 1.5 to 3.0. Particularly, the molecular weight distribution may be 2.5 or less, more particularly, 1.7 or more, or 1.8 or more, or 1.9 or more and 2.3 or less, or 2.1 or less, or 2.0 or less.

Generally, in case of polymerizing two or more kinds of monomers, molecular weight distribution (MWD) increases, and as a result, impact strength and mechanical properties may decrease and blocking phenomenon, etc. may arise. About this, in the present invention, an optimal amount of hydrogen is injected during carrying out polymerization reaction, and the molecular weight and molecular weight distribution of the ethylene/alpha-olefin copolymer thus prepared are decreased, and as a result, impact strength, mechanical properties, etc. are improved.

Meanwhile, in the present invention, the weight average molecular weight (Mw) and number average molecular weight (Mn) are polystyrene conversion molecular weights which are analyzed by gel permeation chromatography (GPC), and the molecular weight distribution may be calculated from the ratio of Mw/Mn.

In addition, the ethylene/alpha-olefin copolymer according to an embodiment of the present invention satisfies ReXRc≤1.0. In this case, Re=kee/kec, Rc=kcc/kce, and kee, kec, kcc and kce represent propagation reaction rate constants as defined above.

The propagation reaction rate constant such as kee, kec, kcc and kce may be obtained by measuring the arrangement of monomers using C13 NMR, and through this, Re and Rc may be calculated. If the calculated product value of Re and Rc (ReXRc) is 1.0 or less, more particularly, 0.95 or less, there is strong possibility that the ethylene/alpha-olefin copolymer is formed into an alternating copolymer, and if the product value of Re and Rc (ReXRc) is greater than 1.0, there is strong possibility that the ethylene-alpha olefin copolymer is formed as a block copolymer. The term "alternating copolymer" means an alternately polymerized shape of two monomer components composing the copolymer (for example: A, B) (for example: -A-B-A-B-A-B-A-B-), and the term "block copolymer" means a shape in which a block is formed by continuously polymerizing one monomer component (A) in a copolymer and then another block is formed by another monomer component (B) to form a block (for example: -A-A-A-A-B-B-B-B-).

Accordingly, the ethylene-alpha olefin copolymer according to an embodiment of the present invention has a product value of Re and Rc (ReXRc) of 1.0 or less, more particularly, 0.95 or less, and may become an alternating copolymer in which an alpha-olefin comonomer is continuously polymerized and uniformly distributed in a polymer main chain. As described above, since the alpha-olefin comonomer is uniformly distributed in a polymer main chain, excellent structural stability may be shown. In addition, if a hot melt adhesive composition is prepared using the ethylene-alpha olefin copolymer, reaction efficiency may be improved through uniform reaction, and as a result, processability may be improved along with adhesiveness.

Particularly, as in the ethylene/alpha-olefin copolymer according to an embodiment of the present invention, if the above-described conditions are satisfied, the change of complex viscosity is little within specific ranges of temperature and shear rate during processing, and significantly excellent processability may be shown.

The ethylene/alpha-olefin copolymer according to an embodiment of the present invention is a copolymer prepared by a specific preparation method and satisfying the density, molecular weight distribution, viscosity and ReXRc value in specific ranges, and may be an ethylene/alpha-olefin copolymer having a low density and an ultra low molecular weight, and uniform dispersibility of a comonomer in a copolymer. Thus, a hot melt adhesive composition prepared through this, may have excellent physical properties such as impact strength and adhesiveness.

The ethylene/alpha-olefin copolymer according to an embodiment of the present invention may be a polymer with an ultra low molecular weight, which has a weight average molecular weight (Mw) of 15,000 to 45,000 g/mol. More particularly, the weight average molecular weight may be 17,000 g/mol or more, or 19,000 g/mol or more, and 40,000 g/mol or less, or 37,000 g/mol or less, or 35,000 g/mol or less.

In addition, the ethylene/alpha-olefin copolymer according to an embodiment of the present invention may have a number average molecular weight (Mn) of 5,000 to 35,000. More particularly, the number average molecular weight may be 7,000 or more, or 8,000 or more, or 9,000 or more, and 30,000 or less, or 25,000 or less.

Furthermore, the ethylene/alpha-olefin copolymer may have a melt index (MI) of 200 to 1,300 dg/min. Particularly, the melt index may be 400 dg/min or more, 500 dg/min or more, and 1,200 dg/min or less, 1,000 dg/min or less. The melt index (MI) is a value measured according to ASTM D-1238 (Condition E, 190° C., 2.16 kg load).

If the weight average molecular weight and the melt index satisfy the above-described ranges, its application to a hot melt adhesive composition may be suitable, and remarkable improvement of processability may be expected in connection with the viscosity. That is, the viscosity affecting the mechanical properties and impact strength of the ethylene/alpha-olefin copolymer, and processability may be controlled by controlling the kind of a catalyst used and the amount of the catalyst used during polymerization, and by satisfying a viscosity range along with the above-described conditions, improved processability may be shown while keeping excellent mechanical properties.

In addition, the ethylene/alpha-olefin copolymer according to an embodiment of the present invention may have a number of unsaturated functional groups of 0.8 or less per 1000 carbon atoms in the copolymer. More particularly, the number of the unsaturated functional groups may be 0.6 or less, or 0.5 or less, or 0.45 or less, or 0.42 or less, or 0.41 or less, and 0.1 or more, or 0.20 or more or 0.3 or more per 1000 carbon atoms constituting the copolymer. The number of the unsaturated functional groups in the copolymer may be controlled by controlling polymerization temperature and the injection amount of hydrogen during preparation. Since the ethylene/alpha-olefin copolymer according to the present invention has the low number of unsaturated functional groups as described above, excellent long-period physical properties including a little discoloration, and molecular weight and viscosity change rate after storing at a high temperature (heat aging) may be shown.

In the present invention, the number of the unsaturated functional groups in the copolymer may be calculated from NMR analysis results. Particularly, the copolymer was dissolved in a chloroform-d (w/TMS) solution, and measurement was performed 16 times at room temperature with an acquisition time of 2 seconds and a pulse angle of 45°, using an Agilent 500 MHz NMR equipment. Then, the TMS peak in 1H NMR was calibrated to 0 ppm, a $CH_3$-related peak (triplet) of 1-octene at 0.88 ppm and a $CH_2$-related peak (broad singlet) of ethylene at 1.26 ppm were confirmed, respectively, and an integration value of the $CH_3$ peak was calibrated to 3 to calculate the content. In addition, the number of double bonds could be calculated based on the integration value of the double bond in 4.5-6.0 ppm region.

In addition, the ethylene/alpha-olefin copolymer according to an embodiment of the present invention may have a crystallization temperature (Tc) of 45° C. or more. More particularly, the crystallization temperature may be 50° C. or more, or 51° C. or more, and 60° C. or less, or 58° C. or less, or 56° C. or less. The high crystallization temperature as described above is due to the uniform distribution of a comonomer in the ethylene/alpha-olefin copolymer, and with the temperature range, excellent structural stability may be shown.

In addition, the ethylene/alpha-olefin copolymer according to an embodiment of the present invention may have a melting temperature (Tm) of 60 to 80° C. More particularly, the melting temperature may be 65° C. or more, or 69° C. or more, or 70° C. or more, and 75° C. or less, or 74.5° C. or less, or 74° C. or less. With the melting temperature in the temperature range as described above, excellent thermal stability may be shown.

In the present invention, the crystallization temperature and melting temperature of the ethylene/alpha-olefin copolymer may be measured using a differential scanning calorimeter (DSC). Particularly, the copolymer is heated to 150° C., kept for 5 minutes, and cooled to 20° C. again, and then, the temperature is elevated again. In this case, the elevating rate and decreasing rate of the temperature are controlled to 10° C./min, respectively, and the results measured in a section where the temperature is secondly elevated is set to the melting temperature, and the results measured in a section where the temperature is decreased is set to the crystallization temperature.

In addition, in the ethylene/alpha-olefin copolymer according to an embodiment of the present invention, the alpha-olefin-based monomer which is the comonomer may be an olefin-based monomer of 4 to 20 carbon atoms. Particular example may include propylene, 1-butene, 1-pentene, 4-methyl-1-pentene, 1-hexene, 1-heptene, 1-octene, 1-decene, 1-undecene, 1-dodecene, 1-tetradecene, 1-hexadecene, or 1-eicocene, and these may be used alone or as a mixture of two or more.

Among them, the alpha-olefin monomer may be 1-butene, 1-hexene or 1-octene considering the remarkable improving effects if applied to a hot melt adhesive composition, and most preferably, 1-octene may be used.

In addition, in the ethylene/alpha-olefin copolymer, the amount of the alpha-olefin which is a comonomer may be appropriately selected from a range satisfying the above-described physical property conditions, and may be particularly greater than 0 and 99 mol % or less, or 10 to 50 mol %.

An ethylene/alpha-olefin copolymer according to another embodiment of the present invention satisfies the following conditions i) to vii):

i) a density of 0.85 to 0.89 g/cc, ii) molecular weight distribution (MWD): 1.5 to 3.0, iii) viscosity: 4,000 cP to 50,000 cP, as measured at a temperature of 180° C., iv) total number of unsaturated functional groups per 1,000 carbon atoms: 0.8 or less, v) number average molecular weight (Mn): 9,000 to 25,000, vi) Melt index (MI) at 190° C., 2.16 kg load by ASTM D1238: 200 to 1,300 dg/min, and vii) Re×Rc≤1.0 where Re=kee/kec, Rc=kcc/kce, kee represents a propagation reaction rate constant when ethylene is added to a propagation chain of which terminal active site is an ethylene monomer, kec represents a propagation reaction rate constant when an alpha olefin comonomer is added to a propagation chain of which terminal active site is an ethylene monomer, kcc represents a propagation reaction rate constant when an alpha olefin comonomer is added to a propagation chain of which terminal active site is an alpha olefin comonomer, and kce represents a propagation reaction rate constant when an ethylene monomer is added to a propagation chain of which terminal active site is an alpha olefin comonomer.

The copolymer as described above may achieve the effects as described above and have a small number of total unsaturated functional groups, and thus, the improvement of effects such as long-period stability may be expected.

2. Method for Preparing Ethylene/Alpha-Olefin Copolymer

Meanwhile, the ethylene/alpha-olefin copolymer having the above-described physical properties may be prepared by a preparation method, including a step of polymerizing ethylene and an alpha-olefin-based monomer by injecting hydrogen in 45 to 100 cc/min in the presence of a catalyst composition including a transition metal compound of Formula 1 below. Accordingly, another aspect of the present invention provides a method for preparing the ethylene/alpha-olefin copolymer.

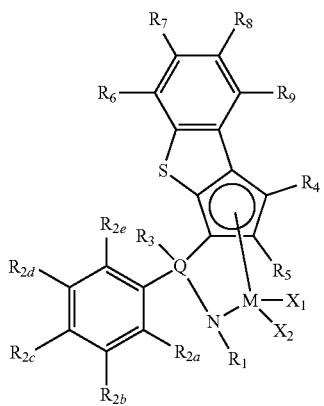

[Formula 1]

In Formula 1, $R_1$ is hydrogen; alkyl of 1 to 20 carbon atoms; cycloalkyl of 3 to 20 carbon atoms; alkenyl of 2 to 20 carbon atoms; alkoxy of 1 to 20 carbon atoms; aryl of 6 to 20 carbon atoms; arylalkoxy of 7 to 20 carbon atoms; alkylaryl of 7 to 20 carbon atoms; or arylalkyl of 7 to 20 carbon atoms, $R_{2a}$ to $R_{2e}$ are each independently hydrogen; halogen; alkyl of 1 to 20 carbon atoms; cycloalkyl of 3 to 20 carbon atoms; alkenyl of 2 to 20 carbon atoms; alkoxy of 1 to 20 carbon atoms; or aryl of 6 to 20 carbon atoms, $R_3$ is hydrogen; halogen; alkyl of 1 to 20 carbon atoms; cycloalkyl of 3 to 20 carbon atoms; alkenyl of 2 to 20 carbon atoms; aryl of 6 to 20 carbon atoms; alkylaryl of 7 to 20 carbon atoms; arylalkyl of 7 to 20 carbon atoms; alkyl amido of 1 to 20 carbon atoms; aryl amido of 6 to 20 carbon atoms; or phenyl which is substituted with one or more selected from the group consisting of halogen, alkyl of 1 to 20 carbon atoms, cycloalkyl of 3 to 20 carbon atoms, alkenyl of 2 to 20 carbon atoms, alkoxy of 1 to 20 carbon atoms and aryl of 6 to 20 carbon atoms, $R_4$ to $R_9$ are each independently hydrogen; silyl; alkyl of 1 to 20 carbon atoms; cycloalkyl of 3 to 20 carbon atoms; alkenyl of 2 to 20 carbon atoms; aryl of 6 to 20 carbon atoms; alkylaryl of 7 to 20 carbon atoms; arylalkyl of 7 to 20 carbon atoms; or a metalloid radical of a metal in group 14, which is substituted with hydrocarbyl of 1 to 20 carbon atoms; where among the $R_6$ to $R_9$, adjacent two or more may be connected with each other to form a ring, Q is Si or C, M is a transition metal in group 4, and $X_1$ and $X_2$ are each independently hydrogen; halogen; alkyl of 1 to 20 carbon atoms; cycloalkyl of 3 to 20 carbon atoms; alkenyl of 2 to 20 carbon atoms; aryl of 6 to 20 carbon atoms; alkylaryl of 7 to 20 carbon atoms; arylalkyl of 7 to 20 carbon atoms; alkylamino of 1 to 20 carbon atoms; or arylamino of 6 to 20 carbon atoms.

In case of including the transition metal compound having the structure of Formula 1 above in a catalyst composition and polymerizing ethylene and an alpha-olefin-based comonomer together with hydrogen, an ethylene/alpha-olefin copolymer having a low density and an ultra low molecular weight may be prepared as described above. Since this ethylene/alpha-olefin copolymer has an extremely small number of unsaturated functional groups and the alpha-olefin comonomer is uniformly mixed in the copolymer, branched chains bonded to the main chain of the copolymer are constant, and the contents of low crystallinity and high crystallinity are relatively small. Accordingly, the preparation of a copolymer with uniform crystallinity distribution may be possible and processability at a low processing temperature may become excellent.

The substituents in Formula 1 will be explained more particularly as follows.

$R_1$ may be hydrogen; alkyl of 1 to 20 carbon atoms; cycloalkyl of 3 to 20 carbon atoms; alkoxy of 1 to 20 carbon atoms; aryl of 6 to 20 carbon atoms; arylalkoxy of 7 to 20 carbon atoms; alkylaryl of 7 to 20 carbon atoms; or arylalkyl of 7 to 20 carbon atoms.

Particularly, $R_1$ may be hydrogen; alkyl of 1 to 12 carbon atoms; cycloalkyl of 3 to 12 carbon atoms; alkoxy of 1 to 12 carbon atoms; aryl of 6 to 12 carbon atoms; arylalkoxy of 7 to 13 carbon atoms; alkylaryl of 7 to 13 carbon atoms; or arylalkyl of 7 to 13 carbon atoms.

More particularly, $R_1$ may be hydrogen or alkyl of 1 to 12 carbon atoms.

$R_{2a}$ to $R_{2e}$ may be each independently hydrogen; halogen; alkyl of 1 to 12 carbon atoms; cycloalkyl of 3 to 12 carbon atoms; alkenyl of 2 to 12 carbon atoms; alkoxy of 1 to 12 carbon atoms; or phenyl.

Particularly, $R_{2a}$ to $R_{2e}$ may be each independently hydrogen; halogen; alkyl of 1 to 12 carbon atoms; cycloalkyl of 3 to 12 carbon atoms; alkenyl of 2 to 12 carbon atoms; alkoxy of 1 to 12 carbon atoms; or phenyl.

More particularly, $R_{2a}$ to $R_2$ may be each independently hydrogen; alkyl of 1 to 12 carbon atoms; or alkoxy of 1 to 12 carbon atoms.

$R_3$ may be hydrogen; halogen; alkyl of 1 to 12 carbon atoms; cycloalkyl of 3 to 12 carbon atoms; alkenyl of 2 to 12 carbon atoms; aryl of 6 to 20 carbon atoms; alkylaryl of 7 to 13 carbon atoms; arylalkyl of 7 to 13 carbon atoms; or phenyl which is substituted with one or more selected from the group consisting of halogen, alkyl of 1 to 12 carbon atoms, cycloalkyl of 3 to 12 carbon atoms, alkenyl of 2 to 12 carbon atoms, alkoxy of 1 to 12 carbon atoms and phenyl.

Particularly, $R_3$ may be hydrogen; halogen; alkyl of 1 to 12 carbon atoms; cycloalkyl of 3 to 12 carbon atoms; alkenyl of 2 to 12 carbon atoms; alkylaryl of 7 to 13 carbon atoms; arylalkyl of 7 to 13 carbon atoms; phenyl; or phenyl which is substituted with one or more selected from the group consisting of halogen, alkyl of 1 to 12 carbon atoms, cycloalkyl of 3 to 12 carbon atoms, alkenyl of 2 to 12 carbon atoms, alkoxy of 1 to 12 carbon atoms and phenyl.

More particularly, $R_3$ may be hydrogen; alkyl of 1 to 12 carbon atoms; or phenyl.

$R_4$ to $R_9$ may be each independently hydrogen; alkyl of 1 to 20 carbon atoms; cycloalkyl of 3 to 20 carbon atoms; aryl of 6 to 20 carbon atoms; alkylaryl of 7 to 20 carbon atoms; or arylalkyl of 7 to 20 carbon atoms.

Particularly, $R_4$ to $R_9$ may be each independently hydrogen; alkyl of 1 to 12 carbon atoms; cycloalkyl of 3 to 12 carbon atoms; aryl of 6 to 12 carbon atoms; alkylaryl of 7 to 13 carbon atoms; or arylalkyl of 7 to 13 carbon atoms.

More particularly, $R_4$ to $R_5$ may be each independently hydrogen; or alkyl of 1 to 12 carbon atoms, and among the $R_6$ to $R_9$, adjacent two or more may be connected with each other to form an aliphatic ring of 5 to 20 carbon atoms or an aromatic ring of 6 to 20 carbon atoms; and the aliphatic ring or the aromatic ring may be substituted with halogen, alkyl of 1 to 20 carbon atoms, alkenyl of 2 to 12 carbon atoms, or aryl of 6 to 12 carbon atoms.

Particularly, among the $R_6$ to $R_9$, adjacent two or more may be connected with each other to form an aliphatic ring of 5 to 12 carbon atoms or an aromatic ring of 6 to 12 carbon atoms; and the aliphatic ring or the aromatic ring may be substituted with halogen, alkyl of 1 to 12 carbon atoms, alkenyl of 2 to 12 carbon atoms, or aryl of 6 to 12 carbon atoms.

More particularly, $R_6$ to $R_9$ may be each independently hydrogen or methyl.

In addition, Q may be Si, and M may be Ti.

$X_1$ and $X_2$ may be each independently hydrogen; halogen; alkyl of 1 to 12 carbon atoms; cycloalkyl of 3 to 12 carbon atoms; alkenyl of 2 to 12 carbon atoms; aryl of 6 to 12 carbon atoms; alkylaryl of 7 to 13 carbon atoms; arylalkyl of 7 to 13 carbon atoms; alkylamino of 1 to 13 carbon atoms; or arylamino of 6 to 12 carbon atoms.

Particularly, $X_1$ and $X_2$ may be each independently hydrogen; halogen; alkyl of 1 to 12 carbon atoms; or alkenyl of 2 to 12 carbon atoms.

More particularly, $X_1$ and $X_2$ may be each independently hydrogen; or alkyl of 1 to 12 carbon atoms.

The transition metal compound of Formula 1 forms a structure in which cyclopentadiene fused with benzothiophene via a cyclic type bond, and an amido group ((N-$R_1$) are stably crosslinked by Q (Si, C, N or P), and a transition metal in group 4 makes a coordination bond. If the catalyst composition is applied for polymerizing an olefin, a polyolefin having high activity, a high molecular weight and properties such as a high copolymerization degree at a high polymerization temperature may be produced.

Further, in the transition metal compound of Formula 1, as the amido group (N-$R_1$) is crosslinked by Q (Si, C, N, P), since Q is bonded to a substituted or unsubstituted phenyl group, more stable crosslinking may be achieved and electronically excellent stability may be achieved if making coordination bond with a transition metal.

Since the transition metal compound having the above-described structure has excellent copolymerization properties due to the phenyl group, a copolymer having a low density may be prepared with a smaller amount of a comonomer with respect to a catalyst which has not a core structure like the transition metal compound of Formula 1, and at the same time, since a molecular weight degree is excellent and polymerization at a high temperature is possible, there are advantages of injecting hydrogen stably.

That is, the transition metal compound is used but an optimized amount of hydrogen is injected during polymerization reaction in the present invention, and thus, an ethylene/alpha-olefin copolymer having an ultra low molecular weight, narrow molecular weight distribution and uniform comonomer distribution may be provided. Due to the electronic/structural stability of the transition metal compound, the inclusion of hydrogen is advantageous. Accordingly, termination reaction is performed uniformly in polymerization reaction due to hydrogen, and effects of preparing a copolymer having narrow molecular weight distribution and an ultra low molecular weight may be expected.

Even further particularly, particular examples of the compound of Formula 1 may include a compound represented by any one among the structures below, but the present invention is not limited thereto.

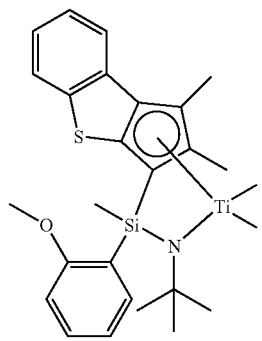

[Formula 1-1]

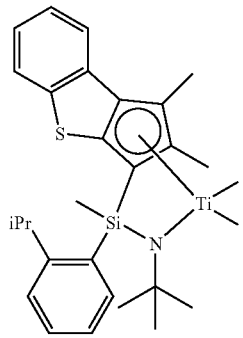

[Formula 1-2]

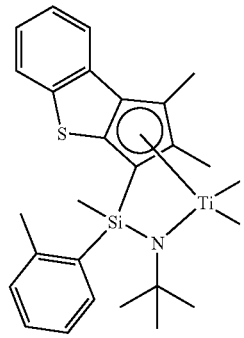

[Formula 1-3]

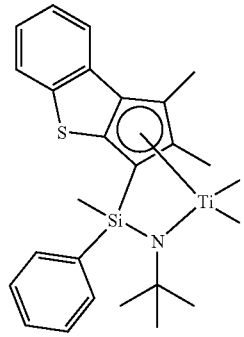

[Formula 1-4]

[Formula 1-5]

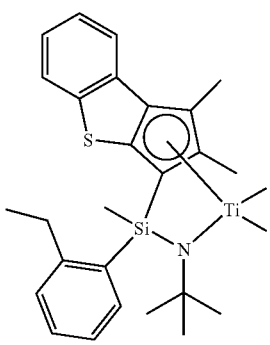

[Formula 1-6]

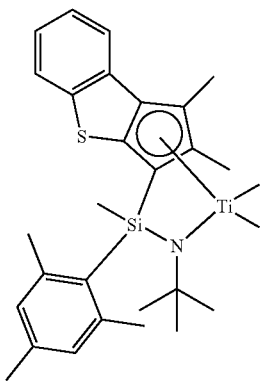

[Formula 1-7]

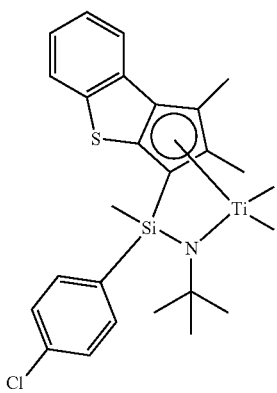

[Formula 1-8]

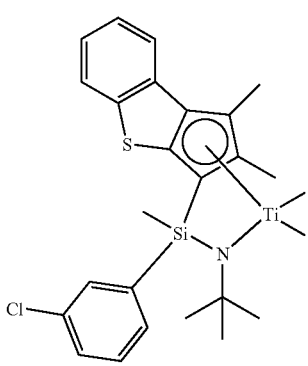

[Formula 1-9]

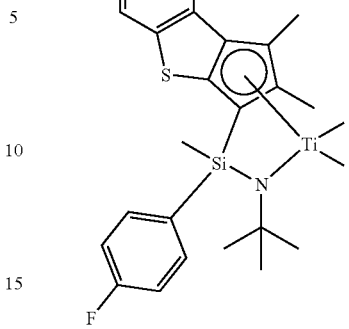

[Formula 1-10]

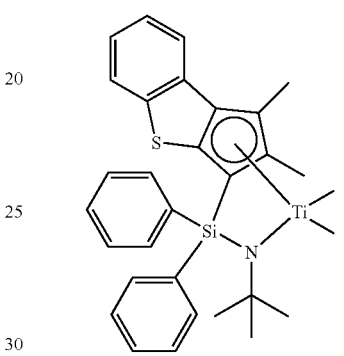

Meanwhile, in the preparation of the ethylene/alpha-olefin copolymer according to an embodiment of the present invention, the catalyst composition may further include a promoter for activating the transition metal compound of Formula 1 above.

The promoter is an organometal compound including a metal in group 13, and particularly may include one or more among a compound of the following Formula 2, a compound of the following Formula 3, and a compound of the following Formula 4:

$$R_{41}-[Al(R_{42})-O]_n-R_{43} \quad \text{[Formula 2]}$$

in Formula 2, $R_{41}$, $R_{42}$ and $R_{43}$ are each independently any one among hydrogen, halogen, a hydrocarbyl group of 1 to 20 carbon atoms, and a halogen-substituted hydrocarbyl group of 1 to 20 carbon atoms, and n is an integer of 2 or more, $$D(R_{44})_3 \quad \text{[Formula 3]}$$

in Formula 3, D is aluminum or boron, and each $R_{44}$ is each independently any one among halogen, a hydrocarbyl group of 1 to 20 carbon atoms, and a halogen-substituted hydrocarbyl group of 1 to 20 carbon atoms, $$[L-H]^+[Z(A)_4]^- \text{ or } [L]^+[Z(A)_4]^- \quad \text{[Formula 4]}$$

in Formula 4,

L is a neutral or cationic Lewis acid; H is a hydrogen atom, and

Z is an element in group 13, and A is each independently a hydrocarbyl group of 1 to 20 carbon atoms; a hydrocarbyloxy group of 1 to 20 carbon atoms; and any one among substituents of which one or more hydrogen atoms are substituted with one or more substituents among halogen, a hydrocarbyloxy group of 1 to 20 carbon atoms, and a hydrocarbylsilyl group of 1 to 20 carbon atoms.

More particularly, the compound of Formula 2 may be an alkylaluminoxane-based compound in which repeating units are combined into a linear, circular or network type, and particular examples may include methylaluminoxane (MAO), ethylaluminoxane, isobutylaluminoxane or tert-butylalminoxane.

In addition, particular examples of the compound of Formula 3 may include trimethylaluminum, triethylaluminum, triisobutylaluminum, tripropylaluminum, tributylaluminum, dimethylchloroaluminum, triisopropylaluminum, tri-s-butylaluminum, tricyclopentylaluminum, tripentylaluminum, triisopentylaluminum, trihexylaluminum, trioctylaluminum, ethyldimethylaluminum, methyldiethylaluminum, triphenylaluminum, tri-p-tolylaluminum, dimethylaluminummethoxide, dimethylaluminumethoxide, trimethylboron, triethylboron, triisobutylboron, tripropylboron or tributylboron, and particularly, may be selected from trimethylaluminum, triethylaluminum or triisobutylaluminum.

In addition, the compound of Formula 4 may include a trisubstituted ammonium salt, dialkyl ammonium salt, or trisubstituted phosphonium type borate-based compound. More particular examples may include a trisubstituted ammonium salt type borate-based compound such as trimethylammonium tetraphenylborate, methyldioctadecylammonium tetraphenylborate, triethylammonium tetraphenylborate, tripropylammonium tetraphenylborate, tri(n-butyl)ammonium tetraphenylborate, methyltetradecyloctadecylammonium tetraphenylborate, N,N-dimethylanilium tetraphenylborate, N,N-diethylanilium tetraphenylborate, N,N-dimethyl(2,4,6-trimethylanilium)tetraphenylborate, trimethylammonium tetrakis(pentafluorophenyl)borate, methylditetradecylammonium tetrakis(pentafluorophenyl)borate, methyldioctadecylammonium tetrakis(pentafluorophenyl)borate, triethylammonium, tetrakis(pentafluorophenyl)borate, tripropylammoniumtetrakis(pentafluorophenyl)borate, tri(n-butyl) ammonium tetrakis(pentafluorophenyl)borate, tri(sec-butyl) ammoniumtetrakis (pentafluorophenyl)borate, N,N-dimethylanilium tetrakis(pentafluorophenyl)borate, N,N-diethylaniliumtetrakis(pentafluorophenyl)borate, N,N-dimethyl(2,4,6-trimethylanilium)tetrakis (pentafluorophenyl)borate, trimethylammoniumtetrakis(2,3,4,6-tetrafluorophenyl)borate, triethylammonium tetrakis(2,3,4,6-tetrafluorophenyl)borate, tripropylammonium tetrakis (2,3,4,6-tetrafluorophenyl)borate, tri(n-butyl)ammonium tetrakis(2,3,4,6-tetrafluorophenyl)borate, dimethyl(t-butyl) ammonium tetrakis(2,3,4,6-tetrafluorophenyl)borate, N,N-dimethylanilium tetrakis(2,3,4,6-tetrafluorophenyl)borate, N,N-diethylanilium tetrakis(2,3,4,6-tetrafluorophenyl)borate, and N,N-dimethyl-(2,4,6-trimethylanilium)tetrakis-(2,3,4,6-tetrafluorophenyl)borate; a dialkylammonium salt type borate-based compound such as dioctadecylammonium tetrakis(pentafluorophenyl)borate, ditetradecylammonium tetrakis(pentafluorophenyl)borate, and dicyclohexylammonium tetrakis(pentafluorophenyl)borate; or a trisubstituted phosphonium salt type borate-based compound such as triphenylphosphonium tetrakis(pentafluorophenyl)borate, methyldioctadecylphosphonium tetrakis(pentafluorophenyl) borate, and tri(2,6-dimethylphenyl)phosphoniumtetrakis (pentafluorophenyl)borate.

By using such a promoter, the molecular weight distribution of a finally prepared ethylene/alpha-olefin copolymer may become more uniform, and polymerization activity may be improved.

The promoter may be used in an appropriate amount so that the activation of the transition metal compound of Formula 1 may be sufficiently proceeded.

In addition, the catalyst composition may include the transition metal compound of Formula 1 in a supported state on a support.

If the transition metal compound of Formula 1 is supported on a support, the weight ratio of the transition metal compound to the support may be 1:10 to 1:1,000, more preferably, 1:10 to 1:500. If the support and the transition metal compound are included in the weight ratio range, an optimized shape may be shown. In addition, if the promoter is supported together on the support, the weight ratio of the promoter to the support may be 1:1 to 1:100, more preferably, 1:1 to 1:50. If the promoter and the support are included in the weight ratio, catalyst activity may be improved, and the minute structure of the polymer thus prepared may be optimized.

Meanwhile, the support may use silica, alumina, magnesia or a mixture thereof, or these materials may be used after removing moisture from the surface by drying at a high temperature, in a state where a hydroxyl group or a siloxane group, which have high reactivity, are included. In addition, the support dried at a high temperature may further include an oxide, a carbonate, a sulfate, or a nitrate component such as $Na_2O$, $K_2CO_3$, $BaSO_4$ and $Mg(NO_3)_2$.

The drying temperature of the support is preferably, from 200 to 800° C., more preferably, from 300 to 600° C., most preferably, from 300 to 400° C. If the drying temperature of the support is less than 200° C., humidity is too high and water at the surface may react with the promoter, and if the temperature is greater than 800° C., the pores at the surface of the support may be combined to decrease the surface area, and a large amount of the hydroxyl groups at the surface may be removed to remain only siloxane groups to decrease reaction sites with the promoter, undesirably.

In addition, the amount of the hydroxyl group at the surface of the support may preferably be 0.1 to 10 mmol/g, and more preferably, 0.5 to 5 mmol/g. The amount of the hydroxyl group at the surface of the support may be controlled by the preparation method and conditions of the support, or drying conditions such as temperature, time, vacuum and spray drying.

Meanwhile, the polymerization reaction of the ethylene/alpha-olefin copolymer may be performed by continuously injecting hydrogen and continuously polymerizing ethylene and an alpha-olefin-based monomer in the presence of the catalyst composition.

In this case, the hydrogen gas restrains the rapid reaction of the transition metal compound at an initial stage of polymerization and plays the role of terminating polymerization reaction. Accordingly, by the use of such hydrogen gas and the control of the amount thereof used, an ethylene/alpha-olefin copolymer having narrow molecular weight distribution with an ultra low molecular weight may be effectively prepared.

The hydrogen gas may be injected in 45 to 100 cc/min, more particularly, 50 to 95 cc/min. If the hydrogen gas is injected under the above-described conditions, the ethylene/alpha-olefin polymer thus prepared may accomplish the physical properties in the present invention. If the hydrogen gas is injected in an amount less than 45 cc/min, the termination of the polymerization reaction may not homogeneously carried out, and the preparation of an ethylene/alpha-olefin copolymer having desired physical properties may become difficult, and if the amount is greater than 100 cc/min, the terminating reaction may arise excessively fast, and it is apprehended that an ethylene/alpha-olefin copolymer having an excessively small molecular weight may be prepared. If the above-described range is satisfied, the reactivity ratio between monomers may be easily controlled, and thus, a copolymer in which an alpha-olefin-based comonomer is uniformly mixed may be prepared.

In addition, the polymerization reaction may be performed at 80 to 200° C., but by controlling the injection amount of the hydrogen together with the polymerization temperature, the number of unsaturated functional groups in the ethylene/alpha-olefin copolymer and the monomer reactivity ratio may be controlled even more advantageously. Accordingly, particularly, the polymerization reaction may be carried out at 100 to 150° C., more particularly, 100 to 140° C.

In addition, during the polymerization reaction, an organoaluminum compound is further injected to remove moisture in a reactor, and the polymerization reaction may be performed in the presence of the compound. Particular examples of such organoaluminum compound may include trialkyl aluminum, dialkyl aluminum halide, alkyl aluminum dihalide, aluminum dialkyl hydride or alkyl aluminum sesquihalide, etc., and more particular examples may include $Al(C_2H_5)_3$, $Al(C_2H_5)_2H$, $Al(C_3H_7)_3$, $Al(C_3H_7)_2H$, $Al(i-C_4H_9)_2H$, $Al(C_8H_{17})_3$, $Al(C_{12}H_{25})_3$, $Al(C_2H_5)(C_{12}H_{25})_2$, $Al(i-C_4H_9)(C_{12}H_{25})_2$, $Al(i-C_4H_9)_2H$, $Al(i-C_4H_9)_3$, $(C_2H_5)_2AlCl$, $(i-C_3H_9)_2AlCl$ or $(C_2H_5)_3Al_2Cl_3$. Such an organoaluminum compound may be continuously injected into the reactor, and for appropriate removal of humidity, the organoaluminum compound may be injected in a ratio of about 0.1 to 10 mole per 1 kg of a reaction medium injected into the reactor.

In addition, a polymerization pressure may be about 1 to about 100 Kgf/cm², preferably, about 1 to about 50 Kgf/cm², more preferably, about 5 to about 30 Kgf/cm².

In addition, if the transition metal compound is used in a supported state on a support, the transition metal compound may be injected after being dissolved or diluted in an aliphatic hydrocarbon solvent of 5 to 12 carbon atoms, for example, pentane, hexane, heptane, nonane, decane, and isomers thereof, an aromatic hydrocarbon solvent such as toluene and benzene, a chlorine atom-substituted hydrocarbon solvent such as dichloromethane and chlorobenzene, etc. The solvent used herein is preferably used after removing a small amount of water or air, which acts as a catalyst poison, by treating with a small amount of alkyl aluminum, and a promoter may be further used.

The ethylene/alpha-olefin copolymer prepared by the above-described preparation method has narrow molecular weight distribution together with a low density and an ultra low molecular weight, and at the same time, and minimized number of unsaturated functional groups in a polymer, and satisfies the conditions of ReXRc≤1.0. Accordingly, excellent physical properties, particularly, excellent long-period properties may be shown, and if applied to a hot melt adhesive composition, processability together with adhesive properties may be improved.

Therefore, according to another embodiment of the present invention, a hot melt adhesive composition including the ethylene/alpha-olefin copolymer is provided.

The hot melt adhesive composition may be prepared according to a common method except for including the ethylene/alpha-olefin copolymer as a main component, and used.

MODE FOR CARRYING OUT THE INVENTION

EXAMPLES

Hereinafter, preferred embodiments will be suggested to assist the understanding of the present invention. However, the embodiments are provided only for easy understanding of the present invention, and the contents of the present invention is not limited thereto.

Synthetic Example: Preparation of Transition Metal Compound

Step 1: Preparation of Ligand Compound (1a-1)

To a 250 mL schlenk flask, 10 g (1.0 eq, 49.925 mmol) of 1,2-dimethyl-3H-benzo[b]cyclopenta[d]thiophene and 100 mL of THF were put, and 22 mL (1.1 eq, 54.918 mmol, 2.5 M in hexane) of n-BuLi was added thereto dropwise at −30° C., followed by stirring at room temperature for 3 hours. A stirred Li-complex THF solution was cannulated into a schlenk flask containing 8.1 mL (1.0 eq, 49.925 mmol) of dichloro(methyl)(phenyl)silane and 70 mL of THF at −78° C., followed by stirring at room temperature overnight. After stirring, drying in vacuum was carried out and extraction with 100 ml of hexane was carried out.

To 100 ml of an extracted chloro-1-(1,2-dimethyl-3H-benzo[b]cyclopenta[d]thiophene-3-yl)-1,1-(methyl)(phenyl)silane hexane solution, 42 mL (8 eq, 399.4 mmol) of t-BuNH₂ was injected at room temperature, followed by stirring at room temperature overnight. After stirring, drying in vacuum was carried out and extraction with 150 ml of hexane was carried out. After drying the solvents, 13.36 g (68%, dr=1:1) of a yellow solid was obtained.

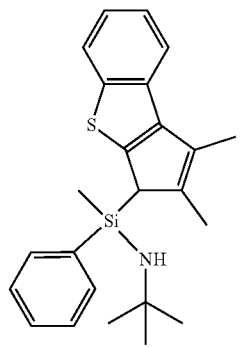

(1a-1)

¹H NMR (CDCl₃, 500 MHz): δ 7.93 (t, 2H), 7.79 (d, 1H), 7.71 (d, 1H), 7.60 (d, 2H), 7.48 (d, 2H), 7.40-7.10 (m, 10H, aromatic), 3.62 (s, 1H), 3.60 (s, 1H), 2.28 (s, 6H), 2.09 (s, 3H), 1.76 (s, 3H), 1.12 (s, 18H), 0.23 (s, 3H), 0.13 (s, 3H)

Step 2: Preparation of Transition Metal Compound (La)

To a 100 mL schlenk flask, 4.93 g (12.575 mmol, 1.0 eq) of a ligand compound of Formula 1a-1 and 50 mL (0.2 M) of toluene were put and 10.3 mL (25.779 mmol, 2.05 eq, 2.5 M in hexane) of n-BuLi was added thereto dropwise at −30° C., followed by stirring at room temperature overnight. After stirring, 12.6 mL (37.725 mmol, 3.0 eq, 3.0 M in diethyl ether) of MeMgBr was added thereto dropwise, 13.2 mL of (13.204 mmol, 1.05 eq, 1.0 M in toluene) TiCl₄ was put in order, followed by stirring at room temperature overnight. After stirring, drying in vacuum and extraction with 150 mL of hexane were carried out, the solvents were removed to 50 mL, and 4 mL (37.725 mmol, 3.0 eq) of DME was added dropwisely, followed by stirring at room temperature overnight. Again, drying in vacuum and extraction with 150 mL of hexane were carried out. After drying the solvents, 2.23 g (38%, dr=1:0.5) of a brown solid was obtained.

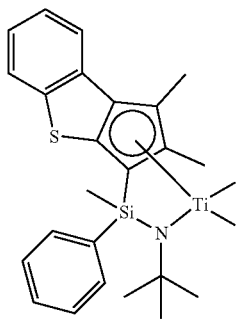

(1a)

$^1$H NMR (CDCl$_3$, 500 MHz): δ 7.98 (d, 1H), 7.94 (d, 1H), 7.71 (t, 6H), 7.50-7.30 (10H), 2.66 (s, 3H), 2.61 (s, 3H), 2.15 (s, 3H), 1.62 (s, 9H), 1.56 (s, 9H), 1.53 (s, 3H), 0.93 (s, 3H), 0.31 (s, 3H), 0.58 (s, 3H), 0.51 (s, 3H), −0.26 (s, 3H), −0.39 (s, 3H)

[Preparation of Ethylene/Alpha-Olefin Copolymer]

Example 1

Into a 1.5 L autoclave continuous process reactor, a hexane solvent (5.0 kg/h) and 1-octene (1.00 kg/h) were charged, and the top of the reactor was pre-heated to a temperature of 150° C. A triisobutylaluminum compound (0.05 mmol/min), the transition metal compound (1a) (0.40 µmol/min) prepared in the Synthetic Example as a catalyst, and a dimethylanilium tetrakis(pentafluorophenyl) borate promoter (1.20 µmol/min) were injected into the reactor at the same time. Then, into the autoclave reactor, ethylene (0.87 kg/h) and a hydrogen gas (50 cc/min) were injected and copolymerization reaction was continuously carried out while maintaining a pressure of 89 bar and a polymerization temperature of 125° C. for 60 minutes or more to prepare a copolymer.

Then, a remaining ethylene gas was exhausted out and the copolymer-containing solution thus obtained was dried in a vacuum oven for 12 hours or more. The physical properties of the copolymer thus obtained were measured.

Examples 2 to 7 and Comparative Examples 1 to 7

Polymers were prepared by carrying out the same method as in Example 1 except that the reactant materials were injected in amounts listed in Table 1 below.

TABLE 1

|  | Catalyst injection amount (µmol/min) | Promoter injection amount (µmol/min) | 1-C8 injection amount (kg/h) | TiBAl (mmol/min) | Polymerization temperature (° C.) | H$_2$ injection amount (cc/min) |
|---|---|---|---|---|---|---|
| Example 1 | 0.40 | 1.20 | 1.00 | 0.05 | 125 | 50 |
| Example 2 | 0.40 | 1.20 | 1.00 | 0.05 | 125 | 75 |
| Example 3 | 0.40 | 1.20 | 1.00 | 0.05 | 125 | 80 |
| Example 4 | 0.40 | 1.20 | 1.00 | 0.05 | 125 | 95 |
| Example 5 | 0.20 | 0.60 | 1.10 | 0.05 | 125 | 85 |
| Example 6 | 0.35 | 1.05 | 1.15 | 0.05 | 145 | 50 |
| Example 7 | 0.35 | 1.05 | 1.15 | 0.05 | 145 | 55 |
| Comparative Example 1 | 0.70 | 2.10 | 2.00 | 0.05 | 150 | 0 |
| Comparative Example 2 | 0.40 | 1.20 | 1.00 | 0.05 | 125 | 0 |
| Comparative Example 3 | 0.40 | 1.20 | 1.00 | 0.05 | 125 | 10 |
| Comparative Example 4 | 0.40 | 1.20 | 1.00 | 0.05 | 125 | 15 |
| Comparative Example 5 | 0.40 | 1.20 | 1.00 | 0.05 | 125 | 130 |
| Comparative Example 6 | 0.26 | 0.78 | 1.20 | 0.05 | 125 | 35 |
| Comparative Example 7 | 0.65 | 1.95 | 2.20 | 0.05 | 160 | 0 |

* In Comparative Examples 6 and 7, [Me$_2$Si(Me$_4$C$_5$)NtBu]Ti(CH$_3$)$_2$ was used as a catalyst.

[Evaluation of Physical Properties of Olefin Polymer]

Experimental Example 1

With respect to the ethylene/alpha-olefin copolymers prepared in the Examples and the Comparative Examples, physical properties were measured according to the methods described below and are shown in Table 2.

1) Density (g/cm$^3$): measured according to ASTM D-792.
2) Viscosity (cP): measured using a Brookfield RVDV3T viscometer and according to the method described below. In detail, 13 ml of a specimen was put in a specimen chamber and heated to 180° C. using Brookfield Thermosel. After the specimen was completely dissolved, a viscometer equipment was lowered to fix a spindle to the specimen chamber, the rotation speed of the spindle (SC-29 high temperature-melt spindle) was fixed to 20 rpm, and viscosity values were deciphered for 20 minutes or more, or until the value was stabilized, and a final value was recorded. For reference, the measurement limit of the viscosity was 50,000 cP.

3) Melting temperature (Tm, ° C.): The melting temperature of a polymer was measured using a differential scanning calorimeter (DSC, apparatus name: DSC 2920, manufacturer: TA instrument). Particularly, the copolymer was heated to 150° C., kept for 5 minutes, and cooled to −100° C., and then, the temperature was elevated again. In this case, the elevating rate and decreasing rate of the temperature were controlled to 10° C./min, respectively. The maximum point of an endothermic peak measured in a second elevating section of the temperature was set to the melting temperature.

4) Crystallization temperature (Tc, ° C.): performed by the same method as for measuring the melting temperature using DSC. From a curve represented while decreasing the temperature, the maximum point of an exothermic peak was set to crystallization temperature.

5) Weight average molecular weight (g/mol) and molecular weight distribution (MWD): a number average molecular weight (Mn) and a weight average molecular weight (Mw) were measured, respectively, under the conditions below by gel permeation chromatography (GPC, PL GPC220), and molecular weight distribution was calculated through dividing the weight average molecular weight by the number average molecular weight:

Column: PL Olexis
Solvent: trichlorobenzene (TCB)
Flow rate: 1.0 ml/min
Specimen concentration: 1.0 mg/ml
Injection amount: 200 μl
Column temperature: 160° C.
Detector: Agilent High Temperature RI detector
Standard: Polystyrene (calibrated by cubic function)

6) Measurement of monomer reactivity ratios (Re, Rc): About 0.4 ml of each of the ethylene-alpha olefin copolymers prepared in the Examples and the Comparative Examples dissolved in a solvent (1,1,2,2-tetrachloroethane-d2 (TCE-d2) was put in a tube which has a diameter of 5 mm and a length of 18 cm. Then, the tube was disposed in a 13C NMR spectrometer, and kee, kec, kcc and kce values were measured in conditions of a frequency of 150 MHz, a temperature of 100° C., a d1 (relaxation delay time) of 3s, and Scans 4 K in the spectrometer. By substituting the values into Mathematical Equations 3 and 4 below, the monomer reactivity ratios were calculated. The measurement of the monomer reactivity ratio was conducted for Examples 1 to 7, and only for Comparative Examples 6 and 7, which satisfy the viscosity defined in the present invention.

$$Re \text{ (reactivity ratio of ethylene monomer)} = kee/kec \quad \text{[Mathematical Equation 3]}$$

$$Rc \text{ (reactivity ratio of alpha olefin comonomer)} = kcc/kce \quad \text{[Mathematical Equation 4]}$$

(In Mathematical Equations 3 and 4, kee represents a propagation reaction rate constant when ethylene is added to a propagation chain of which terminal active site is an ethylene monomer, kec represents a propagation reaction rate constant when an alpha olefin comonomer is added to a propagation chain of which terminal active site is an ethylene monomer, kcc represents a propagation reaction rate constant when an alpha olefin comonomer is added to a propagation chain of which terminal active site is an alpha olefin comonomer, and kce represents a propagation reaction rate constant when an ethylene monomer is added to a propagation chain of which terminal active site is an alpha olefin comonomer.)

TABLE 2

| | Density (g/cc) | Tc/Tm (° C.) | Viscosity (cP) | Mw (g/mol) | Molecular weight distribution (MWD) | Monomer reactivity ratio | | |
|---|---|---|---|---|---|---|---|---|
| | | | | | | Re | Rc | ReXRc |
| Example 1 | 0.873 | 50.6/66.5 | 35000 | 34900 | 1.98 | 7.31 | 0.13 | 0.95 |
| Example 2 | 0.875 | 52.0/68.1 | 17000 | 24400 | 1.96 | 9.30 | 0.10 | 0.93 |
| Example 3 | 0.876 | 52.3/68.9 | 13500 | 22400 | 1.98 | 6.71 | 0.14 | 0.94 |
| Example 4 | 0.877 | 53.2/69.7 | 8500 | 19500 | 1.77 | 8.09 | 0.11 | 0.89 |
| Example 5 | 0.875 | 52.2/68.3 | 17000 | 24500 | 1.96 | 8.53 | 0.11 | 0.94 |
| Example 6 | 0.876 | 52.2/68.8 | 13500 | 22300 | 2.00 | 8.82 | 0.11 | 0.97 |
| Example 7 | 0.876 | 52.5/69.1 | 8800 | 19700 | 1.99 | 7.83 | 0.12 | 0.94 |
| Comparative Example 1 | 0.872 | 49.7/66.0 | >50000 | 46800 | 2.14 | — | — | — |
| Comparative Example 2 | 0.874 | 51.5/67.6 | >50000 | 75400 | 2.08 | — | — | — |
| Comparative Example 3 | 0.874 | 51.3/67.8 | >50000 | 57700 | 2.09 | — | — | — |
| Comparative Example 4 | 0.873 | 50.5/66.3 | >50000 | 48700 | 2.08 | — | — | — |
| Comparative Example 5 | 0.879 | 55.7/72.7 | 3500 | 14600 | 1.97 | — | — | — |
| Comparative Example 6 | 0.876 | 56.1/73.2 | 13900 | 22800 | 1.94 | 1.29 | 1.56 | 1.50 |
| Comparative Example 7 | 0.875 | 55.3/73.1 | 15800 | 26700 | 2.24 | 8.11 | 0.25 | 2.03 |

In Table 2, "—" means not measured.

Referring to Table 2, the ethylene/alpha-olefin copolymers of Examples 1 to 7, which were prepared by using the catalyst composition including the transition metal compound according to the present invention and injecting hydrogen during polymerization, showed a low density, an ultralow molecular weight (evaluated by viscosity), narrow molecular weight distribution, and a ReXRc value of 1.0 or less, more particularly, 0.97 or less, when compared with Comparative Examples 1 to 7.

Particularly, in case of Comparative Examples 1 to 4, in which hydrogen was not injected or injected in an amount not more than a certain amount, copolymers with a quite high molecular weight were prepared, and molecular weight distribution was broad and thus, inferior physical properties were expected. In addition, in case of Comparative Example 5, in which an excessive amount of hydrogen was injected, polymerization was terminated at an early stage due to hydrogen, and it was found that a copolymer having a too small molecular weight was prepared.

In addition, in case of Comparative Example 7, in which hydrogen was not injected and a catalyst other than the catalyst according to the present invention was applied, molecular weight distribution was significantly broad, and the ReXRc value was greater than 1.0 and a large value of 2.03 was derived, and thus, it was expected that a nonuniform copolymer was prepared. It was confirmed through Comparative Example 6 that the disappearance of such nonuniformity was not achieved though hydrogen was injected.

With the catalyst used in Comparative Examples 6 and 7, a polymer with a high molecular weight could not be obtained and copolymerization properties with respect to the comonomer was degraded when compared with the catalyst applied in Examples 1 to 7, and the capacity capable of controlling the polymerization reaction by injecting hydrogen was definitely small and the reactivity ratio of the monomer was not controlled. From the results, it was confirmed that the comonomer was not uniformly mixed even though the viscosity was low, and the ReXRc value was large and greater than 1.0. In conclusion, this phenomenon is analogized as a phenomenon by which processing becomes an impossible level, because the catalyst of Comparative Examples 6 and 7 has too low viscosity with the further injection of hydrogen.

Experimental Example 2

With respect to Example 2 and Comparative Example 7, viscosity change was measured while fixing a frequency to 6.28 rad/s (1 Hz) and elevating the temperature, and shown in FIG. 1. Similarly, with respect to Example 3 and Comparative Example 6, viscosity change was measured while elevating the temperature and shown in FIG. 2. With respect to Example 2 and Comparative Example 7, viscosity change was measured while changing angular frequency at 80° C. and shown in FIG. 3. With respect to Example 3 and Comparative Example 6, viscosity change was measured while changing angular frequency at 80° C. and shown in FIG. 4. The measurement method of the viscosity is the same as described above.

Figure 2:
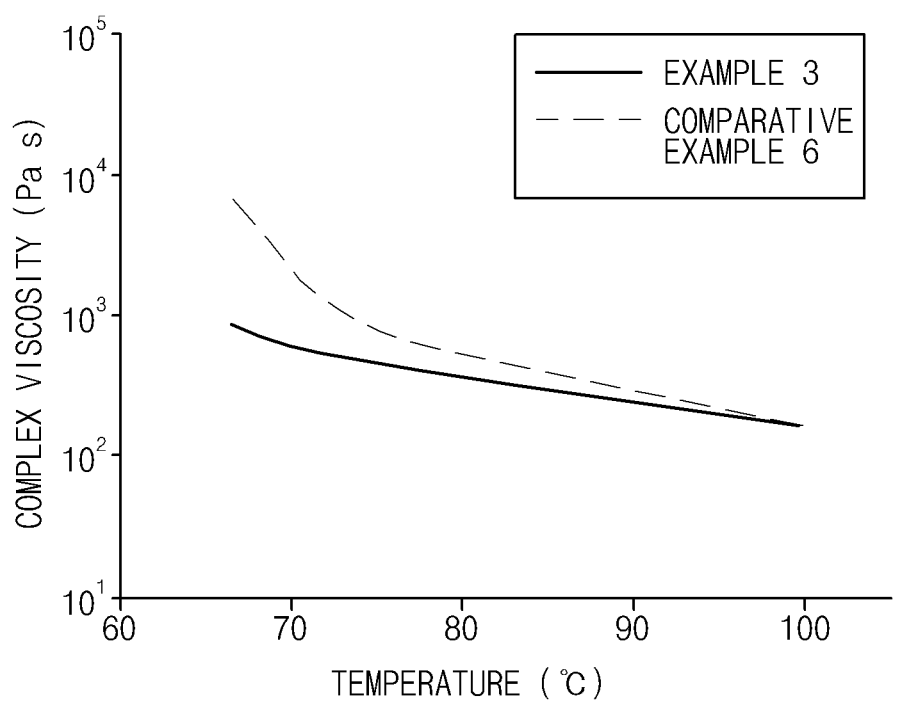
FIG. 2 shows measured results of viscosity change according to temperature change with respect to Example 3 as an embodiment of the present invention and Comparative Example 6.

In FIG. 1, Example 2 shows a low complex viscosity in all temperature regions when compared with Comparative Example 7 which showed similar density, and in FIG. 2, Example 3 shows a low complex viscosity in all temperature regions when compared with Comparative Example 6 which showed similar density. Accordingly, the ethylene/alpha-olefin copolymer of the present invention may be processed at a low temperature, and the load on the equipment during processing a product is small to increase an output, thereby showing advantages considering energy efficiency.

Figure 3:
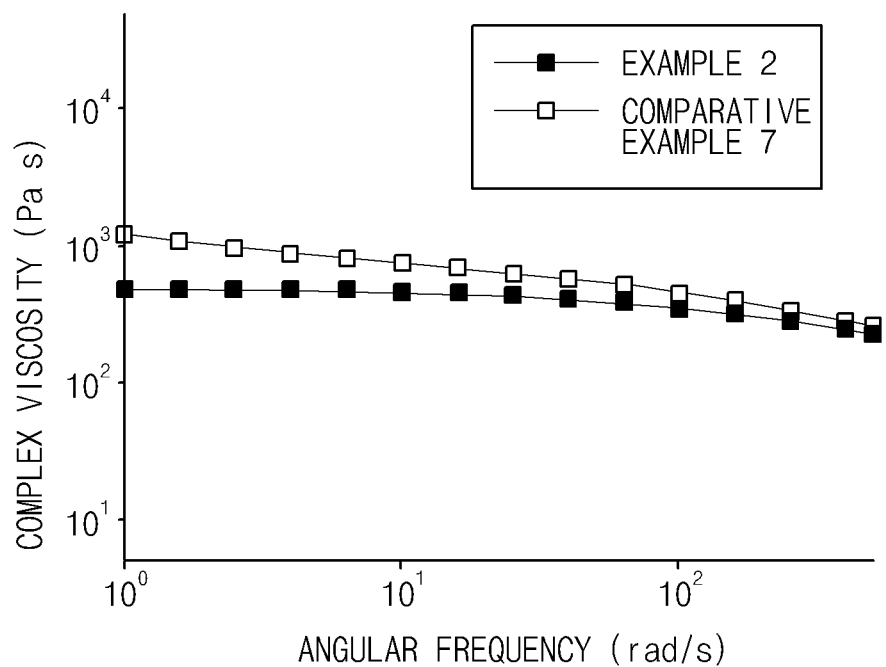
FIG. 3 shows measured results of viscosity change according to angular frequency change with respect to Example 2 as an embodiment of the present invention and Comparative Example 7.
Figure 4:
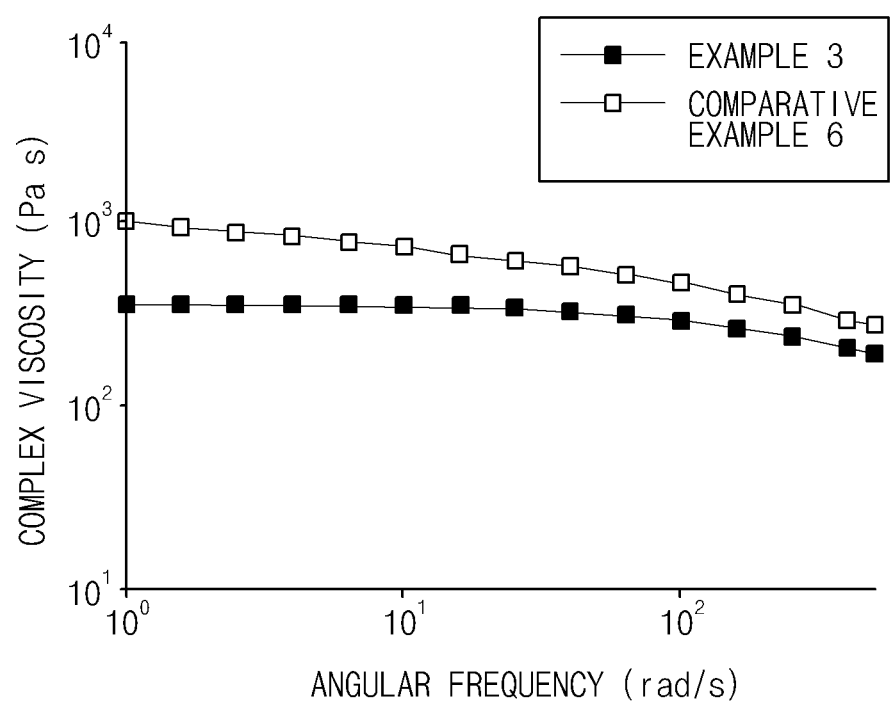
FIG. 4 shows measured results of viscosity change according to angular frequency change with respect to Example 3 as an embodiment of the present invention and Comparative Example 6.

In FIG. 3 and FIG. 4, the viscosity change data according to the change of the angular frequency, were obtained by measuring viscosity in an angular frequency range of $\omega=1$-500 rad/s so as to imitate a circumstance when a specimen was injected with a high shear rate and a circumstance when a specimen was stood at a shear rate of nearly 0 in a stationary state after injection. During processing a polymer, a certain degree of a pressure is applied, and this is for copying this situation.

According to FIG. 3, in a specific frequency band set, it could be confirmed that Example 2 showed a lower complex viscosity than Comparative Example 7. In FIG. 4, Example 3 also showed a lower complex viscosity than Comparative Example 6 in a specific frequency band set. Accordingly, the ethylene/alpha-olefin copolymer of the present invention was confirmed to have improved processability when compared with the Comparative Examples.

In other words, through the expression of a low complex viscosity in conditions of changing temperature and conditions of changing shear rate during processing, it could be found that the processability of the ethylene/alpha-olefin copolymer prepared according to an embodiment of the present invention was significantly excellent.

As described above, the ethylene/alpha-olefin copolymer of the present invention has a low density, a low molecular weight and narrow molecular weight distribution, and thus, is expected to have better impact strength and mechanical properties when compared with the Comparative Examples. In addition, the ethylene/alpha-olefin copolymers of Examples 1 to 5 show a ReXRc value of 1.0 or less, more particularly, a ReXRc value of 0.95 or less, and a comonomer such as 1-octene is uniformly distributed in a polymer, thereby showing excellent structural stability. As a result, if applied to a hot melt adhesive composition, it could be found that reaction efficiency may be improved through uniform reaction, and processability may be improved together with adhesiveness.

The invention claimed is:

1. An ethylene/alpha-olefin copolymer satisfying the following conditions i) to iv):
    i) density: 0.85 to 0.89 g/cc, measured according to ASTM D-792,
    ii) molecular weight distribution (MWD): 1.5 to 3.0,
    iii) viscosity: 6,000 cP to 40,000 cP, when measured at a temperature of 180° C., and
    iv) ReXRc≤1.0
    where Re=kee/kec, Rc=kcc/kce,
    kee represents a propagation reaction rate constant when ethylene is added to a propagation chain of which terminal active site is an ethylene monomer, kec represents a propagation reaction rate constant when an alpha olefin comonomer is added to a propagation chain of which terminal active site is an ethylene monomer,
    kcc represents a propagation reaction rate constant when an alpha olefin comonomer is added to a propagation chain of which terminal active site is an alpha olefin comonomer, and kce represents a propagation reaction rate constant when an ethylene monomer is added to a propagation chain of which terminal active site is an alpha olefin comonomer.

2. The ethylene/alpha-olefin copolymer according to claim 1, wherein the viscosity is 8,500 to 35,000 cP, when measured at a temperature of 180° C.

3. The ethylene/alpha-olefin copolymer according to claim 1, wherein a weight average molecular weight is 17,000 to 40,000 g/mol.

4. The ethylene/alpha-olefin copolymer according to claim 1, wherein the ReXRc value is 0.95 or less.

5. The ethylene/alpha-olefin copolymer according to claim 1, wherein the density is 0.860 to 0.885 g/cc, measured according to ASTM D-792.

6. The ethylene/alpha-olefin copolymer according to claim 1, wherein the alpha-olefin comprises one or more selected from the group consisting of propylene, 1-butene, 1-pentene, 4-methyl-1-pentene, 1-hexene, 1-heptene, 1-octene, 1-decene, 1-undecene, 1-dodecene, 1-tetradecene, 1-hexadecene, and 1-eicocene.

7. The ethylene/alpha-olefin copolymer according to claim 1, wherein the alpha-olefin is one or more selected from the group consisting of 1-buene, 1-hexene and 1-octene.

8. The ethylene/alpha-olefin copolymer according to claim 1, wherein the alpha-olefin is comprised in an amount of from greater than 0 to 99 mol % or less, with respect to a total weight of the copolymer.

9. The ethylene/alpha-olefin copolymer according to claim 1, further satisfying the following conditions v) to vii):
   v) total number of unsaturated functional groups per 1,000 carbon atoms: 0.8 or less,
   vi) number average molecular weight (Mn): 9,000 to 25,000, and
   vii) melt index (MI) at 190° C., 2.16 kg load by ASTM D1238: 200 to 1,300 dg/min.

10. The ethylene/alpha-olefin copolymer according to claim 1, wherein the ethylene/alpha-olefin copolymer has a crystallization temperature (Tc) of 45° C. to 60° C., and a melting temperature (Tm) of 60 to 80° C., wherein both the crystallization temperature and the melting temperature are measured using a differential scanning calorimeter (DSC).

11. A method of preparing the ethylene/alpha-olefin copolymer of claim 1, comprising a step of polymerizing ethylene and an alpha-olefin-based monomer by injecting hydrogen in 45 to 100 cc/min in the presence of a catalyst composition including a transition metal compound of Formula 1:

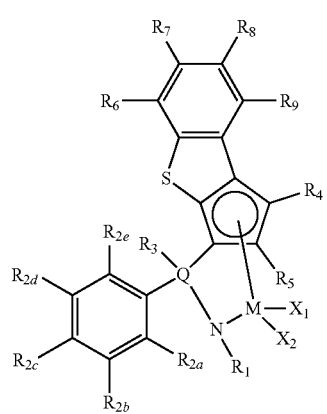

[Formula 1]

wherein, $R_1$ is hydrogen; alkyl of 1 to 20 carbon atoms; cycloalkyl of 3 to 20 carbon atoms; alkenyl of 2 to 20 carbon atoms; alkoxy of 1 to 20 carbon atoms; aryl of 6 to 20 carbon atoms; arylalkoxy of 7 to 20 carbon atoms; alkylaryl of 7 to 20 carbon atoms; or arylalkyl of 7 to 20 carbon atoms, $R_{2a}$ to $R_{2e}$ are each independently hydrogen; halogen; alkyl of 1 to 20 carbon atoms; cycloalkyl of 3 to 20 carbon atoms; alkenyl of 2 to 20 carbon atoms; alkoxy of 1 to 20 carbon atoms; or aryl of 6 to 20 carbon atoms, $R_3$ is hydrogen; halogen; alkyl of 1 to 20 carbon atoms; cycloalkyl of 3 to 20 carbon atoms; alkenyl of 2 to 20 carbon atoms; aryl of 6 to 20 carbon atoms; alkylaryl of 7 to 20 carbon atoms; arylalkyl of 7 to 20 carbon atoms; alkyl amido of 1 to 20 carbon atoms; aryl amido of 6 to 20 carbon atoms; or phenyl which is substituted with one or more selected from the group consisting of halogen, alkyl of 1 to 20 carbon atoms, cycloalkyl of 3 to 20 carbon atoms, alkenyl of 2 to 20 carbon atoms, alkoxy of 1 to 20 carbon atoms and aryl of 6 to 20 carbon atoms, $R_4$ to $R_9$ are each independently hydrogen; silyl; alkyl of 1 to 20 carbon atoms; cycloalkyl of 3 to 20 carbon atoms; alkenyl of 2 to 20 carbon atoms; aryl of 6 to 20 carbon atoms; alkylaryl of 7 to 20 carbon atoms; arylalkyl of 7 to 20 carbon atoms; or a metalloid radical of a metal in group 14, which is substituted with hydrocarbyl of 1 to 20 carbon atoms; where among the $R_6$ to $R_9$, adjacent two or more are optionally connected with each other to form a ring, Q is Si or C, M is a transition metal in group 4, and $X_1$ and $X_2$ are each independently hydrogen; halogen; alkyl of 1 to 20 carbon atoms; cycloalkyl of 3 to 20 carbon atoms; alkenyl of 2 to 20 carbon atoms; aryl of 6 to 20 carbon atoms; alkylaryl of 7 to 20 carbon atoms; arylalkyl of 7 to 20 carbon atoms; alkylamino of 1 to 20 carbon atoms; or arylamino of 6 to 20 carbon atoms.

12. The method of preparing the ethylene/alpha-olefin copolymer according to claim 11, wherein the compound of Formula 1 comprises a compound represented by any one among the structures below:

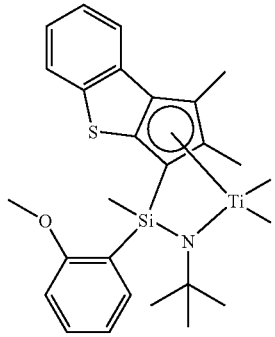

[Formula 1-1]

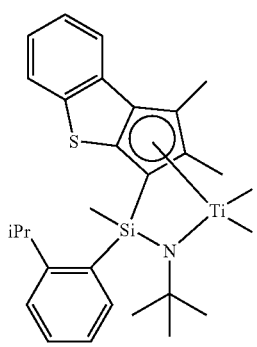

[Formula 1-2]

[Formula 1-3]
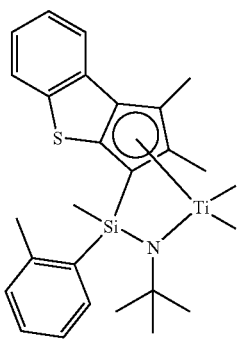
[Formula 1-4]
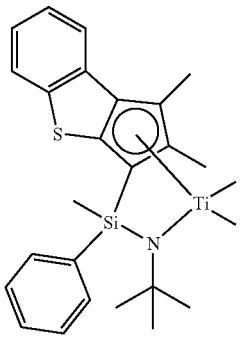
[Formula 1-5]
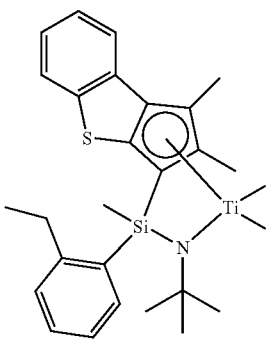
[Formula 1-6]
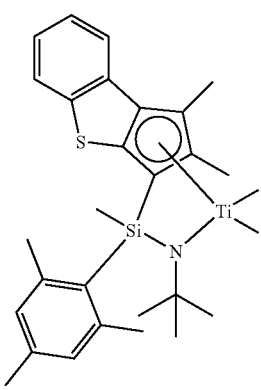
[Formula 1-7]
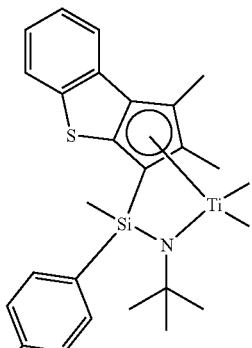
[Formula 1-8]
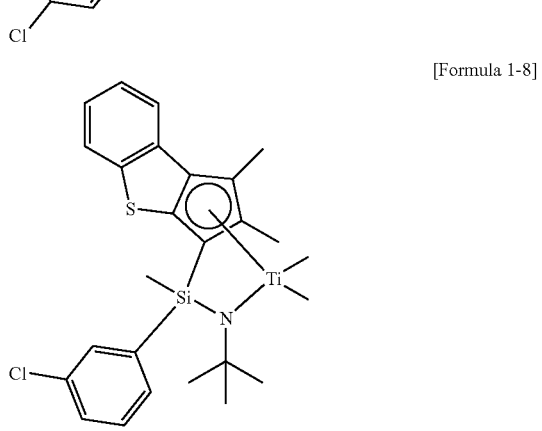
[Formula 1-9]
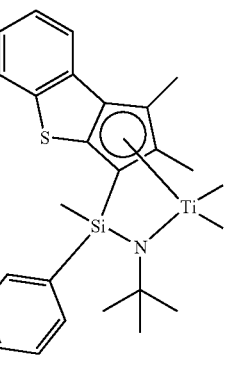
[Formula 1-10]
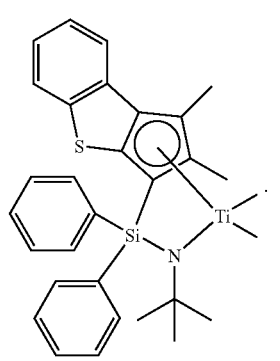
13. The method of preparing the ethylene/alpha-olefin copolymer according to claim 11, wherein the catalyst composition further comprises a promoter for activating the transition metal compound of Formula 1.

14. The method of preparing the ethylene/alpha-olefin copolymer according to claim 13, wherein the promotor comprises an organometal compound including a metal in group 13.

15. The method of preparing the ethylene/alpha-olefin copolymer according to claim 13, wherein the promotor comprises one or more selected from a compound of the following Formula 2, a compound of the following Formula 3, or a compound of the following Formula 4:

$$R_{41}-[Al(R_{42})-O]n-R_{43}\text{tm} \quad \text{[Formula 2]}$$

in Formula 2, $R_{41}$, $R_{42}$ and $R_{43}$ are each independently any one selected from hydrogen, halogen, a hydrocarbyl group of 1 to 20 carbon atoms, or a halogen-substituted hydrocarbyl group of 1 to 20 carbon atoms, and n is an integer of 2 or more, $$D(R_{44})_3 \quad \text{[Formula 3]}$$

in Formula 3, D is aluminum or boron, and each $R_{44}$ is each independently any one selected from halogen, a hydrocarbyl group of 1 to 20 carbon atoms, or a halogen-substituted hydrocarbyl group of 1 to 20 carbon atoms, $$[L-H]^+[Z(A)_4]^- \text{ or } [L]^+[Z(A)_4]^- \quad \text{[Formula 4]}$$

in Formula 4, H is a hydrogen atom, and Z is an element in group 13, A is each independently a hydrocarbyl group of 1 to 20 carbon atoms; or a hydrocarbyloxy group of 1 to 20 carbon atoms, wherein the hydrocarbyl group or hydrocarbyloxy group is unsubstituted or substituted with one or more substituents selected from halogen, a hydrocarbyloxy group of 1 to 20 carbon atoms, or a hydrocarbylsilyl group of 1 to 20 carbon atoms, L is a neutral Lewis base and $[L-H]^+$is a conjugated acid cation in $[L-H]^+[Z(A)_4]^-$, and $[L]^+$is a Lewis acid in $[L]^+[Z(A)_4]^-$.

16. The method of preparing the ethylene/alpha-olefin copolymer according to claim 11, wherein the transitional metal compound of Formula 1 is in a supported state on a support, and a weight ratio of the transitional metal compound of Formula 1 to the support is 1:10 to 1:1,000.

17. The method of preparing the ethylene/alpha-olefin copolymer according to claim 16, wherein the support is silica, alumina, magnesia or a mixture thereof.

18. The method of preparing the ethylene/alpha-olefin copolymer according to claim 11, wherein the step of polymerizing is performed at 80° C. to 200° C., and under about 1 to about 100 kgf/cm².

19. The method of preparing the ethylene/alpha-olefin copolymer according to claim 11, wherein an organoaluminum compound is further injected during the step of polymerizing in a ratio of about 0.1 to 10 mole per 1 kg of a reaction medium injected.

* * * * *